(12) United States Patent
Yang et al.

(10) Patent No.: US 12,632,113 B2
(45) Date of Patent: May 19, 2026

(54) THREE-DIMENSIONAL MODELING SYSTEM AND MODELING METHOD BASED ON MULTIMODAL FUSION

(71) Applicant: NANJING UNIVERSITY OF POSTS AND TELECOMMUNICATIONS, Jiangsu (CN)

(72) Inventors: Haigen Yang, Jiangsu (CN); Jingsai Geng, Jiangsu (CN); Mei Wang, Jiangsu (CN); Luyang Li, Jiangsu (CN); Erhan Dai, Jiangsu (CN)

(73) Assignee: NANJING UNIVERSITY OF POSTS AND TELECOMMUNICATIONS, Jiangsu (CN)

( * ) Notice: Subject to any disclaimer, the term of this patent is extended or adjusted under 35 U.S.C. 154(b) by 269 days.

(21) Appl. No.: 18/580,159

(22) PCT Filed: Apr. 4, 2023

(86) PCT No.: PCT/CN2023/086093
§ 371 (c)(1),
(2) Date: Jan. 18, 2024

(87) PCT Pub. No.: WO2024/036982
PCT Pub. Date: Feb. 22, 2024

(65) Prior Publication Data
US 2025/0004554 A1       Jan. 2, 2025

(30) Foreign Application Priority Data
Aug. 19, 2022    (CN) ......................... 202210996062.7

(51) Int. Cl.
*A61B 5/103*       (2006.01)
*A61B 5/24*       (2021.01)
(Continued)

(52) U.S. Cl.
CPC .............. *G06F 3/015* (2013.01); *G06F 3/013* (2013.01); *G06F 3/017* (2013.01); *G06F 3/167* (2013.01);
(Continued)

(58) Field of Classification Search
USPC ......... 700/95–185, 245–262, 900; 703/1–23; 706/1–62, 900–904, 919–923;
(Continued)

(56) References Cited

U.S. PATENT DOCUMENTS 10,007,336 B2 *   6/2018   McMurrough ......... G06F 3/013
10,210,382 B2 *   2/2019   Shotton ................... G06F 3/017
(Continued)

FOREIGN PATENT DOCUMENTS

CN       106569607       4/2017
CN       106997236       8/2017
(Continued)

OTHER PUBLICATIONS

Liu, Wei-dong; A Three-dimensional Modelling Method Based On Brain-Computer Interface; 2017 (Year: 2017).*
(Continued)

*Primary Examiner* — Marcellus J Augustin
(74) *Attorney, Agent, or Firm* — JCIPRNET

(57) ABSTRACT

Disclosed are a three-dimensional modeling system and modeling method based on multimodal fusion. The method includes: separately collecting feedback data of an electro-encephalogram sensor, an electromyography sensor, an eye movement sensor, a gesture sensor, and a voice sensor, conducting multimodal fusion on the feedback data, obtaining multimodal-fused model data, matching the model data with a database instruction, obtaining and analyzing an instruction set, obtaining and identifying a relevant modeling parameter, obtaining a modeling method, automatically
(Continued)

conducting modeling according to the modeling method, and obtaining a visual entity model. Through the method of the present disclosure, multi-sense man-machine interaction is combined with traditional geometric modeling, and a complicated modeling command input operation does not require manipulation of interactive devices such as a keyboard and a mouse, such that modeling efficiency is improved, waste of manipulation energy of an operator is reduced, and further modeling experience of the operator is improved.

8 Claims, 2 Drawing Sheets

(51) Int. Cl.

| | | |
|---|---|---|
| *G06F 3/01* | (2006.01) | |
| *G06F 3/16* | (2006.01) | |
| *G06T 17/00* | (2006.01) | |
| *G06T 19/20* | (2011.01) | |

(52) U.S. Cl.
CPC .............. *G06T 17/00* (2013.01); *G06T 19/20* (2013.01); *G06T 2219/2016* (2013.01)

(58) Field of Classification Search
USPC ................................................. 717/100–166
See application file for complete search history.

(56) References Cited

U.S. PATENT DOCUMENTS

| | | | |
|---|---|---|---|
| 2002/0077534 A1 | 6/2002 | DuRousseau | |
| 2019/0313967 A1* | 10/2019 | Lee | A61B 5/1116 |
| 2021/0022641 A1* | 1/2021 | Siddharth | A61B 5/0205 |
| 2021/0267529 A1* | 9/2021 | Rubin | A61B 5/369 |

FOREIGN PATENT DOCUMENTS

| | | |
|---|---|---|
| CN | 107301675 | 10/2017 |
| CN | 109993131 | 7/2019 |
| CN | 112424727 | 2/2021 |
| CN | 115329578 | 11/2022 |

OTHER PUBLICATIONS

"International Search Report (Form PCT/ISA/210) of PCT/CN2023/086093", mailed on Jun. 12, 2023, pp. 1-4.
"Written Opinion of the International Searching Authority (Form PCT/ISA/237) of PCT/CN2023/086093", mailed on Jun. 12, 2023, pp. 1-8.

\* cited by examiner

THREE-DIMENSIONAL MODELING SYSTEM AND MODELING METHOD BASED ON MULTIMODAL FUSION

CROSS-REFERENCE TO RELATED APPLICATION

This application is a 371 of international application of PCT application serial no. PCT/CN2023/086093, and filed on Apr. 4, 2023, which claims priority benefit of Chinese Patent Application No. 202210996062.7, and filed on Aug. 19, 2022. The entirety of each of the above mentioned patent applications is hereby incorporated by reference herein and made a part of this specification.

TECHNICAL FIELD

The present disclosure belongs to the technical field of three-dimensional modeling, and particularly relates to a three-dimensional modeling system and modeling method based on multimodal fusion.

BACKGROUND

A traditional geometric modeling method requires an operator to interact with a visual modeling interface by means of a mouse and a keyboard. Further the operator needs to edit or find a complex modeling command when facing complex modeling in this method. In this case, modeling time will be prolonged, and moreover, the modeling system is likely to get stuck or other systems may be unstable when modeling occupies a large memory of an operating system. If this situation occurs for a long time, a modeling operation process will be cumbersome and boring. Therefore, it cannot give a modeling operator a better modeling experience.

SUMMARY OF INVENTION

Invention objective: in order to overcome defects in the prior art, the present disclosure provides a three-dimensional modeling system and modeling method based on multimodal fusion. Through the method of the present disclosure, multi-sense man-machine interaction is combined with traditional geometric modeling, and a complicated modeling command input operation does not require manipulation of interactive devices such as a keyboard and a mouse. Compared with a traditional modeling method, modeling efficiency is improved, waste of manipulation energy of an operator is reduced, and further modeling experience of the operator is improved.

Technical solutions: in a first aspect, the present disclosure provides a three-dimensional modeling method based on multimodal fusion. The method includes:

separately collecting feedback data of an electroencephalogram sensor, an electromyography sensor, an eye movement sensor, a gesture sensor, and a voice sensor;

conducting multimodal fusion on the feedback data, and obtaining multimodal-fused model data;

matching the model data with a database instruction, and obtaining an instruction set;

analyzing an attribute of the instruction set, and obtaining a relevant modeling parameter;

identifying the relevant modeling parameter, and obtaining a modeling method; and automatically conducting modeling on the basis of the modeling method, and obtaining a visual entity model.

The model data of the visual entity model is mapped onto the instruction set. A correspondence between the instruction set and the model data is obtained. The correspondence between the instruction set and the model data is stored in a back-end database for later loading.

In a further example, the separately collecting feedback data of an electroencephalogram sensor, an electromyography sensor, an eye movement sensor, a gesture sensor, and a voice sensor includes:

arranging the electroencephalogram sensor, the electromyography sensor, the eye movement sensor, the gesture sensor and the voice sensor at different positions of a body of an operator respectively; and collecting brain command data of the operator by the electroencephalogram sensor, collecting facial muscle change data of the operator by the electromyography sensor, collecting eye movement change data of the operator by the eye movement sensor, collecting gesture change data of the operator by the gesture sensor, and collecting voice data transmitted by the operator by the voice sensor.

In a further example, the conducting multimodal fusion on the feedback data, and obtaining multimodal-fused model data include:

conducting data fusion on brain command data, facial muscle change data, eye movement change data, gesture change data and voice data, and obtaining the model data.

In a further example, the matching the model data with a database instruction, and obtaining an instruction set include:

obtaining the instruction set configured to generate different instruction collections on the basis of the model data according to a correspondence between different types of data and different instructions in a database. A model instruction is generated on the basis of brain command data. A geometric model instruction is generated on the basis of facial muscle change data. A modeling position determination instruction is generated on the basis of eye movement change data. Rotation and contraction instructions are generated on the basis of gesture change data. A revocation or deletion instruction is generated on the basis of voice data.

In a further example, the relevant modeling parameters include: a name, a class, a model number, a geometric feature, and a mathematical expression.

In a further example, the analyzing an attribute of the instruction set, and obtaining a relevant modeling parameter include:

transmitting the instruction set to a modeling system, and obtaining the relevant modeling parameter. The modeling system analyzes a mathematical characteristic and a physical characteristic of a modeled object according to the attribute of the instruction set.

In a further example, the modeling method includes:

basic body modeling, extended body modeling. Boolean operation modeling, stretching modeling, rotation modeling, and complex modeling.

The basic body modeling includes: using geometric modeling commands for a cuboid, a sphere, a cylinder, a cone, a wedge and a ring body, a geometric sphere, a teapot, a rectangular pyramid, a tubular body, and several irregular bodies.

The extended body modeling includes: extending geometric modeling command parameters in the basic body modeling.

The Boolean operation modeling includes: creating a more complex three-dimensional entity model through Boolean operation between all entity elements on the basis of the extended body modeling and the basic body modeling.

The stretching modeling includes: creating a three-dimensional entity model on the basis of a two-dimensional graphic base surface.

The rotation modeling includes: conducting rotation around any base line, and generating a three-dimensional entity model.

The complex modeling includes: introducing a mathematical function, and creating a surface of a three-dimensional entity model.

In a second aspect, the present disclosure provides a three-dimensional modeling system based on multimodal fusion. The system includes: a somatosensory sensor module, a communication module, a model building module, and a database module.

The somatosensory sensor module is configured to conduct multimodal fusion on various feedback data collected, and obtain multimodal-fused model data.

The communication module is configured to upload the model data.

The database module is configured to match the model data with a database instruction, and obtain an instruction set; and store a correspondence between the instruction set and the model data.

The model building module is configured to analyze an attribute of the instruction set, obtain a relevant modeling parameter, identify the relevant modeling parameter, obtain a modeling method, automatically conduct modeling on the basis of the modeling method, and output a visual entity model.

In a further example, the communication module includes a transmission terminal and a reception terminal. The transmission terminal and the reception terminal conduct communication in a message format after establishing a communication relation.

In a third aspect, the present disclosure provides a readable storage medium that stores a computer program. The computer program implements steps of the method mentioned above when executed by a processor.

Beneficial effects: compared with the prior art, the present disclosure has the following advantages:

Through the method of the present disclosure, multi-sense man-machine interaction is combined with traditional geometric modeling, and a complicated modeling command input operation does not require manipulation of interactive devices such as a keyboard and a mouse. Compared with a traditional modeling method, modeling efficiency is improved, and a manipulation frequency of an operator is reduced.

Man-machine interaction is conducted with a somatosensory device so as to overcome defects of traditional modeling through man-machine interaction, and a body change signal of the operator is selected as an input target of an editing command, such that man-machine interaction is conducted according to somatic sensation, and all information of somatosensory changes may be presented in the modeling system of a computer. A more humanized man-machine interaction method is provided during modeling, and an immersive modeling experience is provided for the operator.

DESCRIPTION OF EMBODIMENTS

To better understand technical contents of the present disclosure, a technical solution of the present disclosure will be further introduced and described below with reference to specific examples, which is not limited herein.

EXAMPLE 1

Figure 1:
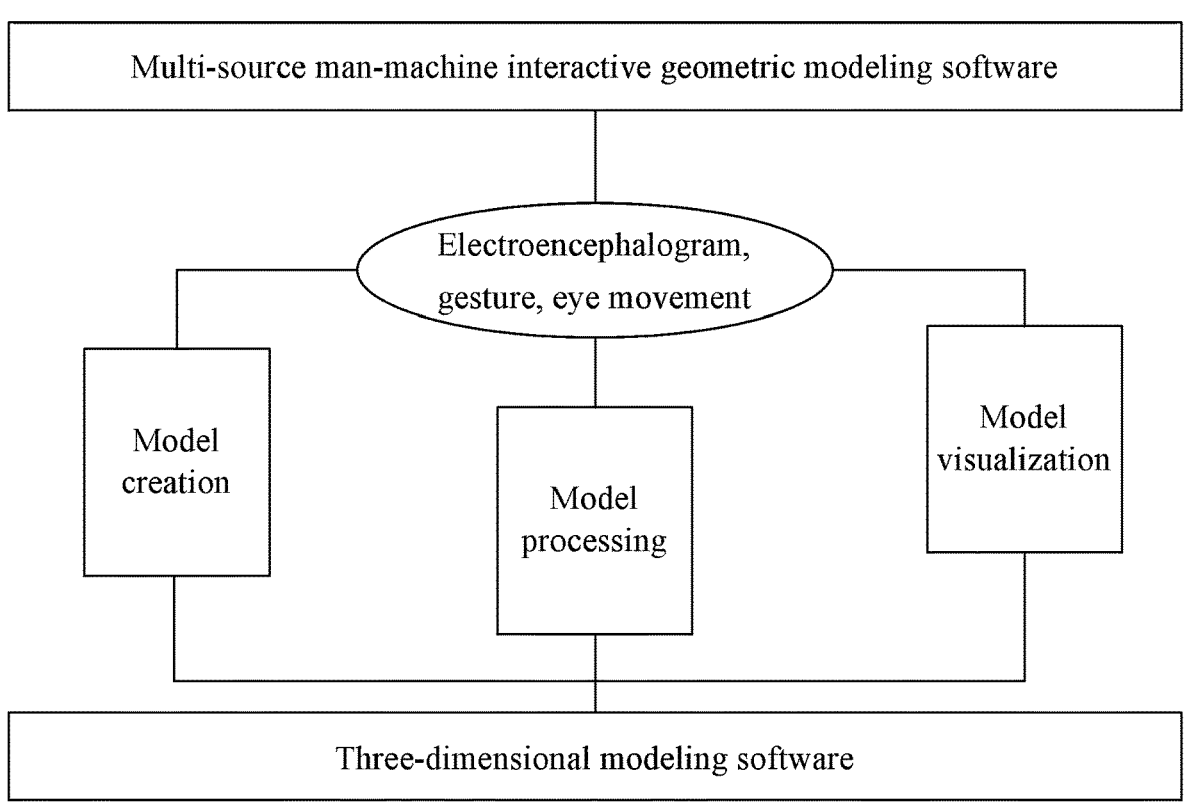
FIG. 1 is a schematic diagram of a system framework of a three-dimensional computer aided design (CAD) modeling system based on multimodal fusion according to the present disclosure.

A three-dimensional modeling system based on multimodal fusion in the example is further described with reference to FIG. 1. The modeling system includes: a somatosensory sensor module, a communication module, a model building module, and a database module.

The somatosensory sensor module is configured to conduct multimodal fusion on various feedback data collected, and obtain multimodal-fused model data.

The communication module is configured to upload the model data.

The database module is configured to match the model data with a database instruction, and obtain an instruction set; and store a correspondence between the instruction set and the model data.

The model building module is configured to analyze an attribute of the instruction set, obtain a relevant modeling parameter, identify the relevant modeling parameter, obtain a modeling method, automatically conduct modeling on the basis of the modeling method, and output a visual entity model.

The communication module includes a transmission terminal and a reception terminal. The transmission terminal and the reception terminal conduct communication in a message format after establishing a communication relation. With user datagram protocol (UDP) communication as an instance:

A communication method in a message format is as follows: a user logs in with a server command format, after the user logs in successfully, a server returns an instruction, and the user transmits a control and data information format to the server, which includes a source address and a destination address. A process of the transmission terminal and the reception terminal is as follows: a socket is initialized, an Internet protocol (IP) address is bound to a port number, a data transmission function is called, and the reception terminal triggers a receiving slot function through a detection signal so as to complete data communication.

EXAMPLE 2

Figure 2:
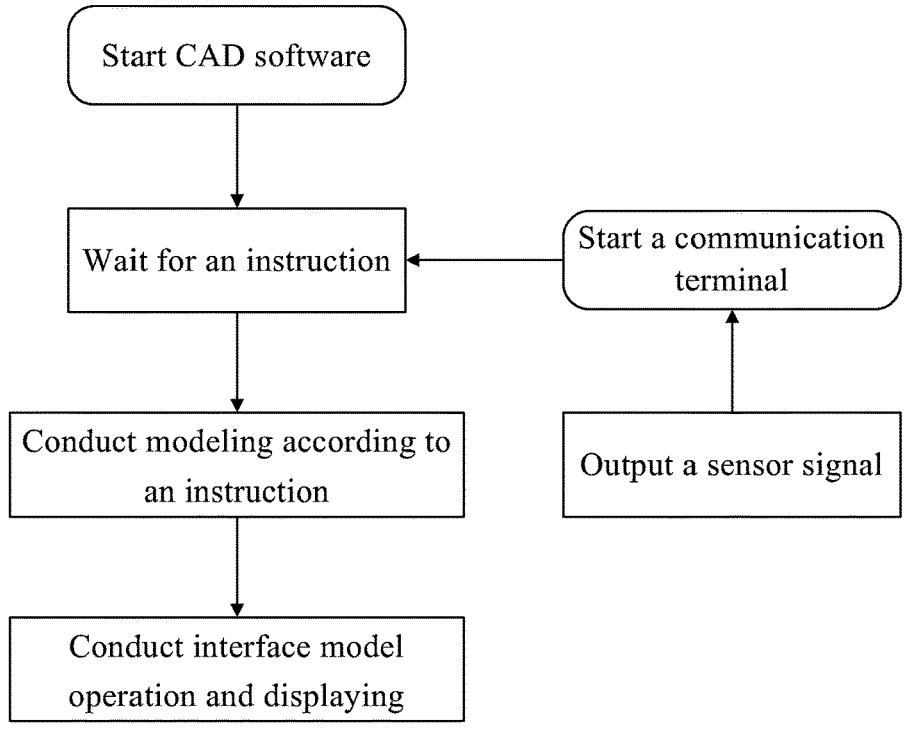
FIG. 2 is a flow diagram of a three-dimensional CAD modeling method based on multimodal fusion according to the present disclosure.
Figure 3:
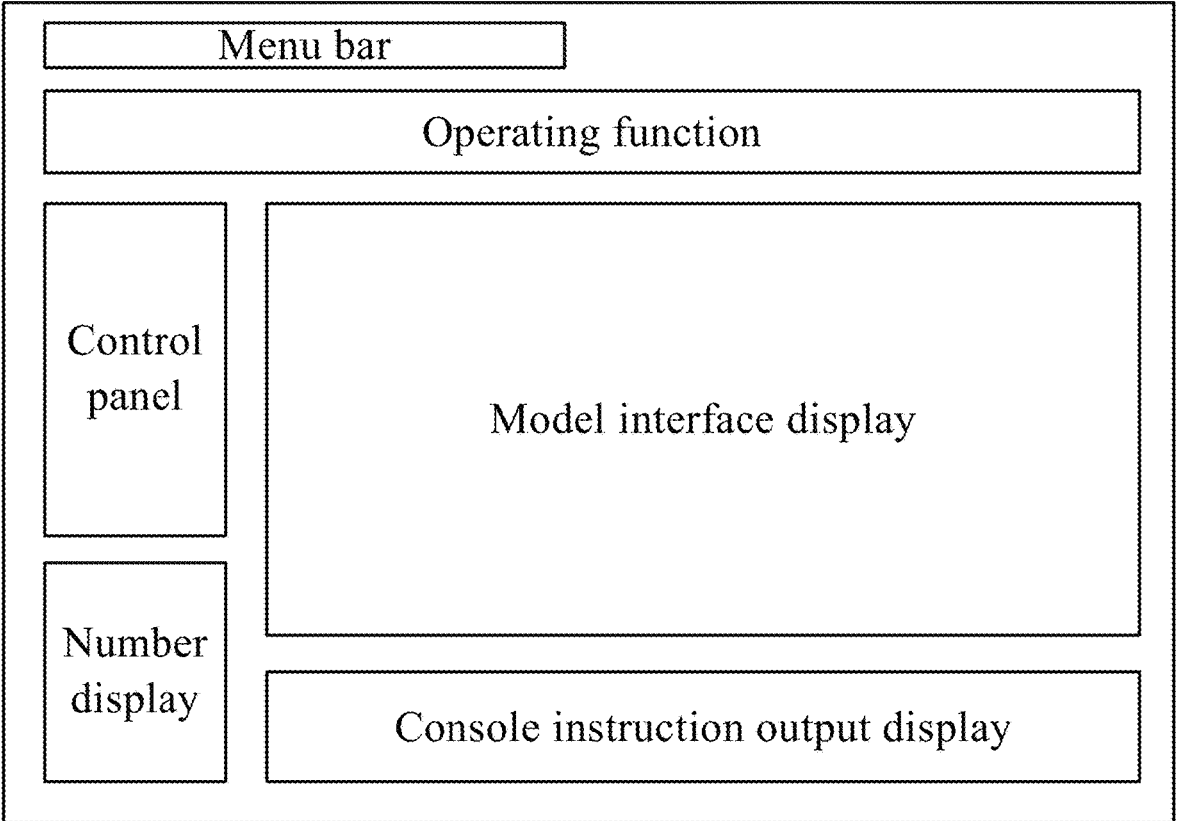
FIG. 3 shows a main interface of a three-dimensional CAD modeling system according to the present disclosure.

A three-dimensional modeling method based on multimodal fusion in the example is further described with reference to FIGS. 2-3. The method includes the following working steps:

feedback data of an electroencephalogram sensor, an electromyography sensor, an eye movement sensor, a gesture sensor and a voice sensor is separately collected;

multimodal fusion is conducted on the feedback data, and multimodal-fused model data is obtained;

the model data is matched with a database instruction, and an instruction set is obtained;

an attribute of the instruction set is analyzed, and a relevant modeling parameter is obtained;

the relevant modeling parameter is identified, and a modeling method is obtained; and modeling is automatically conducted on the basis of the modeling method, and a visual entity model is obtained.

The model data of the visual entity model is mapped onto the instruction set. A correspondence between the instruction set and the model data is obtained. The correspondence between the instruction set and the model data is stored in a back-end database for later loading.

The feedback data of the electroencephalogram sensor, the electromyography sensor, the eye movement sensor, the gesture sensor and the voice sensor is separately collected as follows:

the electroencephalogram sensor, the electromyography sensor, the eye movement sensor, the gesture sensor and the voice sensor are arranged at different positions of a body of an operator respectively; and brain command data of the operator is collected by the electroencephalogram sensor, facial muscle change data of the operator is collected by the electromyography sensor, eye movement change data of the operator is collected by the eye movement sensor, gesture change data of the operator is collected by the gesture sensor, and voice data transmitted by the operator is collected by the voice sensor.

Multimodal fusion is conducted on the feedback data, and the multimodal-fused model data is obtained as follows:

data fusion is conducted on brain command data, facial muscle change data, eye movement change data, gesture change data and voice data, and the model data is obtained.

The model data is matched with a database instruction, and an instruction set is obtained as follows:

the instruction set configured to generate different instruction collections is obtained on the basis of the model data according to a correspondence between different types of data and different instructions in a database. A model instruction is generated on the basis of brain command data. A geometric model instruction is generated on the basis of facial muscle change data. A modeling position determination instruction is generated on the basis of eye movement change data. Rotation and contraction instructions are generated on the basis of gesture change data. A revocation or deletion instruction is generated on the basis of voice data.

The relevant modeling parameters include: a name, a class, a model number, a geometric feature, and a mathematical expression.

The attribute of the instruction set is analyzed, and the relevant modeling parameter is obtained as follows:

the instruction set is transmitted to a modeling system, and the relevant modeling parameter is obtained. The modeling system analyzes a mathematical characteristic and a physical characteristic of a modeled object according to the attribute of the instruction set.

The modeling method includes: basic body modeling, extended body modeling, Boolean operation modeling, stretching modeling, rotation modeling, and complex modeling.

The modeling method is specifically as follows: the basic body modeling in the system provides some simple three-dimensional body commands and methods for a painter. Commands for a cuboid, a sphere, a cylinder, a cone, a wedge, a ring body, etc. are provided. In addition, commands for a geometric sphere, a teapot, a rectangular pyramid, a tubular body, etc. are further provided.

The extended body modeling is the same as the basic body modeling. A producer may directly use various parametric extended geometric modeling methods provided in software. A three-dimensional model of a chamfered cube, a chamfered cylinder, an oil drum, a chamfered prism, a spindle body, etc. is drawn.

Boolean operation is based on the idea that an entity model may be expressed through a voxel construction method. A more complex three-dimensional entity model is created through Boolean operation between all entity elements.

The stretching modeling has a consistent idea with the rotation modeling and lofting modeling, which is no longer based on the above entity model. A three-dimensional entity model is created on the basis of a two-dimensional graphic. The idea and principle of the stretching modeling is to generate a three-dimensional model by adding a thickness of a two-dimensional section.

A basic principle of the rotation modeling is to form a three-dimensional model by selecting a curve as a generatrix and conducting rotation around a certain axis. All three-dimensional objects having a rotation symmetry axis may be generated through a rotation method, such as a wine glass, a wheel, and a shaft.

The complex modeling is to create a complex model, and especially some irregular models. For instance, it is difficult to use mathematical analytical expressions to express surfaces constituting automobile bodies, telephones, etc. Generally, the above type of surface is called a free-form surface, which is formed by dividing the surface into surface elements and connecting the surface elements. Generally, surface elements are represented through two methods: interpolation and approximation. The interpolation method represents the surface elements with simple polynomials, and coefficients of the polynomials are determined by continuous conditions of segmentation points, and for instance, a bicubic surface element. The approximation method specifies several control points outside a division point, and the surface elements are represented by a function determined by the points, and for instance, a Bezier surface element.

EXAMPLE 3

The example further describes a readable storage medium that stores a computer program. The computer program, when executed by a processor, implements steps of the following method:

feedback data of an electroencephalogram sensor, an electromyography sensor, an eye movement sensor, a gesture sensor and a voice sensor is separately collected;

conducting multimodal fusion on the feedback data, and obtaining multimodal-fused model data;

the model data is matched with a database instruction, and an instruction set is obtained;

an attribute of the instruction set is analyzed, and a relevant modeling parameter is obtained;

the relevant modeling parameter is identified, and a modeling method is obtained; and modeling is automatically conducted on the basis of the modeling method, and a visual entity model is obtained.

The model data of the visual entity model is mapped onto the instruction set. A correspondence between the instruction set and the model data is obtained. The correspondence between the instruction set and the model data is stored in a back-end database for later loading.

EXAMPLE 4

In the example, an operation flow of building an entity model in computer aided design (CAD) modeling software is as follows:

A communication terminal and the CAD modeling software are started. The CAD modeling software is started after the communication terminal is started. A CAD modeling software object may appear on a right side of a real page of the communication terminal. In this case, a received signal of a multi-source sensor may be analyzed into an instruction of the CAD modeling software, and then a modeling software object may be selected to be transmitted.

The communication terminal receives the signal output from the multi-source sensor, and analyzes and converts the signal into a corresponding modeling operation instruction. With drilling as an instance, firstly, an electroencephalogram sensor releases a signal so as to establish a specific cube, and the communication terminal receives the following commands and transmits an instruction to the CAD modeling software. In this case, a cube is generated on a CAD modeling software interface.

Then, the electroencephalogram sensor releases a signal so as to establish a specific cylinder, and the communication terminal receives the following commands and transmits an instruction to the CAD modeling software. In this case, a cylinder is generated on the CAD modeling software interface.

Finally, an electromyography sensor releases a signal so as to conduct drilling, and the communication terminal receives the following commands and transmits an instruction to the CAD modeling software. In this case, a cube drilled is generated on the CAD modeling software interface.

In stretching operation, the electromyography sensor releases a signal so as to conduct stretching, and the communication terminal receives a command and transmits an instruction to the CAD modeling software. In this case, a cube drilled is generated on the CAD modeling software interface.

In conclusion, through the method of the present disclosure, multi-sense man-machine interaction is combined with traditional geometric modeling, and a complicated modeling command input operation does not require manipulation of interactive devices such as a keyboard and a mouse. Compared with a traditional modeling method, modeling efficiency is improved, and a manipulation frequency of an operator is reduced.

Man-machine interaction is conducted with a somatosensory device so as to overcome defects of traditional modeling through man-machine interaction, and a body change signal of the operator is selected as an input target of an editing command, such that man-machine interaction is conducted according to somatic sensation, and all information of somatosensory changes may be presented in the modeling system of a computer. A more humanized man-machine interaction method is provided during modeling, and an immersive modeling experience is provided for the operator.

The examples of the present disclosure can be provided as methods, systems, or computer program products. Therefore, the present disclosure can employ full hardware examples, full software examples, or software and hardware combined examples. Moreover, the present disclosure can take a form of a computer program product implemented on one or more computer usable storage media (including, but not limited to, a disk memory, a compact disc read-only memory (CD-ROM), an optical memory, etc.) including computer usable program codes.

The examples of the present disclosure can be provided as methods, systems, or computer program products. Therefore, the present disclosure can employ full hardware examples, full software examples, or software and hardware combined examples. Moreover, the present disclosure can take a form of a computer program product implemented on one or more computer usable storage media (including, but not limited to, a disk memory, a compact disc read-only memory (CD-ROM), an optical memory, etc.) including computer usable program codes.

The present disclosure is described with reference to flow diagrams and/or block diagrams of methods, devices (systems), and computer program products according to the examples of the present disclosure. It should be understood that each flow and/or block in the flow diagrams and/or block diagrams and combinations of the flows and/or blocks in the flow diagrams and/or block diagrams can be implemented by computer program instructions. The computer program instructions can be provided for a processor of a general-purpose computer, a special-purpose computer, an embedded processor, or other programmable data processing devices, to produce a machine, such that instructions executed by the processor of the computer or other programmable data processing devices produce an apparatus used for implementing functions specified in one or more flows of each flow diagram and/or one or more blocks of each block diagram.

The computer program instructions can also be stored in a computer readable memory that is capable of guiding a computer or other programmable data processing devices to work in a specific manner, such that the instructions stored in the computer readable memory produce an article of manufacture including an instruction apparatus, and the instruction apparatus implements functions specified in one or more flows of each flow diagram and/or one or more blocks in each block diagram.

The computer program instructions can be loaded onto a computer or another programmable data processing device, such that a series of operations and steps are conducted on the computer or the another programmable device, thereby generating computer-implemented processing. Therefore, the instructions executed on the computer or the another programmable device provide steps for implementing a specific function in one or more flows in the flow diagrams and/or in one or more blocks in the block diagrams.

What are described above are merely the preferred embodiments of the present disclosure. Some improvements and transformations can also be made without departing from the technical principle of the present disclosure, and these improvements and transformations should also fall within the protection scope of the present disclosure.

What is claimed is:

1. A three-dimensional modeling method based on multimodal fusion, comprising:

separately collecting feedback data of an electroencephalogram sensor, an electromyography sensor, an eye movement sensor, a gesture sensor, and a voice sensor by arranging the electroencephalogram sensor, the electromyography sensor, the eye movement sensor, the gesture sensor and the voice sensor at different positions of a body of an operator respectively, and collecting brain command data of the operator by the electroencephalogram sensor, collecting facial muscle change data of the operator by the electromyography sensor, collecting eye movement change data of the operator by the eye movement sensor, collecting gesture change data of the operator by the gesture sensor, and collecting voice data transmitted by the operator by the voice sensor;

conducting multimodal fusion on the feedback data by conducting data fusion on the brain command data, the facial muscle change data, the eye movement change data, the gesture change data and the voice data, and obtaining multimodal-fused model data;

matching the model data with a database instruction, and obtaining an instruction set;

analyzing an attribute of the instruction set, and obtaining a relevant modeling parameter;

identifying the relevant modeling parameter, and obtaining a modeling method; and automatically conducting modeling on the basis of the modeling method, and obtaining a visual entity model, wherein the model data of the visual entity model is mapped onto the instruction set, a correspondence between the instruction set and the model data is obtained, and the correspondence between the instruction set and the model data is stored in a back-end database for later loading.

2. The three-dimensional modeling method based on multimodal fusion according to claim 1, wherein the step of matching the model data with the database instruction, and obtaining the instruction set comprise:

obtaining the instruction set configured to generate different instruction collections on the basis of the model data according to a correspondence between different types of data and different instructions in a database, wherein a model instruction is generated on the basis of the brain command data, a geometric model instruction is generated on the basis of the facial muscle change data, a modeling position determination instruction is generated on the basis of the eye movement change data, rotation and contraction instructions are generated on the basis of the gesture change data, and a revocation or deletion instruction is generated on the basis of the voice data.

3. The three-dimensional modeling method based on multimodal fusion according to claim 1, wherein the relevant modeling parameter comprises: a name, a class, a model number, a geometric feature, and a mathematical expression.

4. The three-dimensional modeling method based on multimodal fusion according to claim 1, wherein the step of analyzing the attribute of the instruction set, and obtaining the relevant modeling parameter comprise:

transmitting the instruction set to a modeling system, and obtaining the relevant modeling parameter, wherein the modeling system analyzes a mathematical characteristic and a physical characteristic of a modeled object according to the attribute of the instruction set.

5. The three-dimensional modeling method based on multimodal fusion according to claim 1, further comprising: basic body modeling, extended body modeling, Boolean operation modeling, stretching modeling, rotation modeling, and complex modeling, wherein the basic body modeling comprises: using geometric modeling commands for a cuboid, a sphere, a cylinder, a cone, a wedge and a ring body, a geometric sphere, a teapot, a rectangular pyramid, a tubular body, and several irregular bodies;

the extended body modeling comprises: extending geometric modeling command parameters in the basic body modeling;

the Boolean operation modeling comprises: creating a more complex three-dimensional entity model through Boolean operation between all entity elements on the basis of the extended body modeling and the basic body modeling;

the stretching modeling comprises: creating a three-dimensional entity model on the basis of a two-dimensional graphic base surface;

the rotation modeling comprises: conducting rotation around any base line, and generating a three-dimensional entity model; and the complex modeling comprises: introducing a mathematical function, and creating a surface of a three-dimensional entity model.

6. A non-transitory readable storage medium, storing a computer program, wherein the computer program implements steps of the method according to claim 1 when executed by a processor.

7. A three-dimensional modeling system based on multimodal fusion, comprising: a somatosensory sensor module, a communication module, a model building module, and a database module, wherein the somatosensory sensor module comprises an electroencephalogram sensor, an electromyography sensor, an eye movement sensor, a gesture sensor, and a voice sensor arranged at different positions of a body of an operator respectively, the electroencephalogram sensor being configured to collect brain command data of the operator, the electromyography sensor being configured to collect facial muscle change data of the operator, the eye movement sensor being configured to collect eye movement change data of the operator, the gesture sensor being configured to collect gesture change data of the operator, the voice sensor being configured to collect voice data transmitted by the operator, and the somatosensory sensor module being is configured to conduct multimodal fusion on the brain command data, the facial muscle change data, the eye movement change data, the gesture change data and the voice data, and obtain multimodal-fused model data;

the communication module is configured to upload the model data;

the database module is configured to match the model data with a database instruction, and obtain an instruction set; and store a correspondence between the instruction set and the model data; and the model building module is configured to analyze an attribute of the instruction set, obtain a relevant modeling parameter, identify the relevant modeling parameter, obtain a modeling method, automatically conduct modeling on the basis of the modeling method, and output a visual entity model.

8. The three-dimensional modeling system based on multimodal fusion according to claim 7, wherein the communication module comprises a transmission terminal and a reception terminal, and the transmission terminal and the reception terminal conduct communication in a message format after establishing a communication relation.

\* \* \* \* \*